United States Patent
Hazelton et al.

(10) Patent No.: US 6,720,862 B2
(45) Date of Patent: Apr. 13, 2004

(54) APPARATUS AND METHOD FOR PREVENTING UN-AUTHORIZED STARTING OF A VEHICLE

(75) Inventors: Lawrence Dean Hazelton, Goodrich, MI (US); Kenneth Brian Hollis, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 436 days.

(21) Appl. No.: 09/758,807

(22) Filed: Jan. 11, 2001

(65) Prior Publication Data

US 2002/0089411 A1 Jul. 11, 2002

(51) Int. Cl.$^7$ .......................... G05B 19/00; B60R 25/04
(52) U.S. Cl. .................. 340/5.64; 307/10.3; 340/426.12
(58) Field of Search .................. 340/5.64, 825.69, 340/825.72, 426.17, 12, 429, 428, 539.1; 307/10.3, 10.2, 10.6; 180/287

(56) References Cited

U.S. PATENT DOCUMENTS

| | | | |
|---|---|---|---|
| 4,110,734 A | 8/1978 | Lepore et al. ............... 340/64 |
| 4,493,001 A | 1/1985 | Sheldrake ................... 361/92 |
| 4,553,127 A | 11/1985 | Issa ........................... 340/64 |
| 4,876,513 A | 10/1989 | Brilmyer et al. ............ 324/427 |
| 4,902,956 A | 2/1990 | Sloan .......................... 320/13 |
| 4,958,084 A | 9/1990 | Carlo et al. ................ 307/10.2 |
| 5,066,905 A | 11/1991 | Betton et al. .............. 324/133 |
| 5,089,762 A | 2/1992 | Sloan .......................... 320/13 |
| 5,119,011 A | 6/1992 | Lambert ...................... 320/43 |
| 5,193,067 A | 3/1993 | Sato et al. ................. 364/483 |
| 5,200,877 A | 4/1993 | Betton et al. ................ 361/92 |
| 5,214,385 A | 5/1993 | Gabriel et al. ............. 324/434 |
| 5,295,078 A | 3/1994 | Stich et al. ................ 364/483 |
| 5,296,997 A | 3/1994 | Betton et al. ................ 361/92 |
| 5,321,627 A | 6/1994 | Reher ........................ 364/483 |
| 5,332,958 A | 7/1994 | Sloan .......................... 320/13 |
| 5,412,323 A | 5/1995 | Kato et al. ................. 324/429 |
| 5,432,429 A | 7/1995 | Armstrong, II et al. ....... 320/43 |
| 5,539,610 A | 7/1996 | Williams et al. ............ 361/246 |
| 5,552,642 A | 9/1996 | Dougherty et al. ......... 307/10.3 |
| 5,576,686 A | 11/1996 | Westermeir et al. ........ 340/426 |
| 5,680,050 A | 10/1997 | Kawai et al. ............... 324/427 |
| 5,691,619 A | 11/1997 | Vingsbo ...................... 320/13 |
| 5,808,443 A | 9/1998 | Lundstrom ................... 320/32 |
| 5,864,237 A | 1/1999 | Kawai et al. ............... 324/430 |
| 5,900,734 A | 5/1999 | Munson ..................... 324/433 |
| 5,929,764 A | 7/1999 | Brink et al. ................ 340/636 |
| 5,965,954 A | 10/1999 | Johnson et al. ........... 307/10.3 |
| 5,977,654 A | 11/1999 | Johnson et al. ........... 307/10.3 |
| 6,166,454 A | 12/2000 | Schaller et al. |
| 6,249,106 B1 | 6/2001 | Turner et al. ............... 320/136 |
| 6,362,599 B1 | 3/2002 | Turner et al. ................. 3/135 |

FOREIGN PATENT DOCUMENTS

| | | |
|---|---|---|
| DE | 44 32 539 A1 | 8/1995 |
| EP | 1 065 112 A2 | 3/2001 |

Primary Examiner—Michael Horabik
Assistant Examiner—William Bangachon
(74) Attorney, Agent, or Firm—Jimmy L. Funke (57) ABSTRACT

A theft prevention device, having a first switch capable of movement between a first position and a second position, the first position electrically connecting an electrical system to a power supply of a vehicle and the device includes a switch bypass circuit being electrically connected to said power supply when the switch is in the second position, the switch bypass circuit allows a current from the power supply to reach the electrical system, this current is less than the current traveling through the switch when the switch is in the first position, the current is sufficiently large enough to maintain volatile memories of electrical components in a vehicle.

8 Claims, 7 Drawing Sheets

APPARATUS AND METHOD FOR PREVENTING UN-AUTHORIZED STARTING OF A VEHICLE

RELATED APPLICATIONS

This application is related to U.S. Pat. Nos. 4,958,084, 5,977,654 and 5,965,954, the contents of which are incorporated herein by reference thereto.

TECHNICAL FIELD

The present application relates to anti-theft devices for motor vehicles and, more particularly, to an apparatus and method for preventing an unauthorized starting of a vehicle.

BACKGROUND OF INVENTION

One of the unpleasant aspects of owing a vehicle is dealing with the potential theft of the vehicle itself. In fact, one factor contributing to the overall cost for owning and operating a motor vehicle is the insurance premiums necessary to cover the inconveniences associated with a theft of the vehicle.

In an attempt to address these problems, a substantial industry has been developed to manufacture and promote various mechanisms for hindering the ease by which an automobile or other motor vehicle can be stolen. These devices include steering wheel locks, alarm systems, and devices which disable certain essential components of the vehicle when a theft is attempted.

SUMMARY OF THE INVENTION

A method and apparatus for allowing a limited amount of current to bypass a switch which prevents an amount of current necessary to start the vehicle engine when the anti-theft device is armed. The amount of current allowed to bypass the switch is sufficient to maintained the volatile memories and such vehicle accessories such as clock time, radio presets and the engine control computer.

The above-described and other features and advantages of the present invention will be appreciated and understood by those skilled in the art from the following detailed description, drawings, and appended claims.

DESCRIPTION OF THE PREFERRED EMBODIMENT

Figure 1:
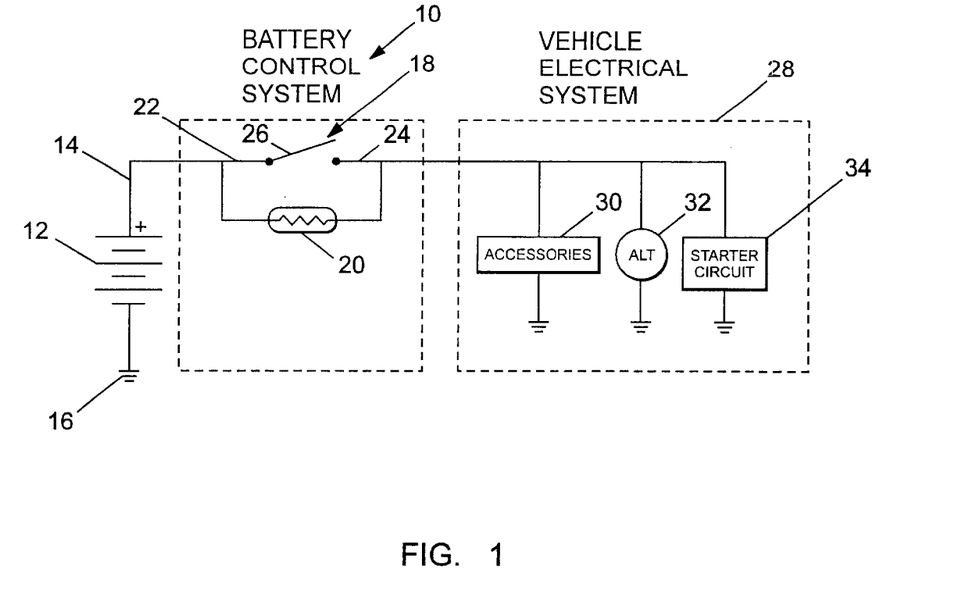
FIG. 1 is a schematic illustration of an anti-theft system.

Referring now to FIG. 1, a battery control system 10 is illustrated. Battery control system 10 is anticipated for use with a vehicle starting system. Of course, battery control system 10 may be used in other applications.

A power supply 12 is connected to battery control system 10 through a positive connection 14 at one end and a ground 16 at the other. Positive connection 14 is coupled to a switch 18 and a resistive element 20. Alternatively, the battery control system is connected to the power supply through a negative connection 15 at one end and a ground at the other.

In an exemplary embodiment, switch 18 is a latching relay. Of course, other switching methods are contemplated for use with battery control system 10. For example, switch 18 can be either mechanical or electrical (e.g. MOSFET or BJT) switches.

Battery supply 12 provides the necessary power for maintaining the volatile memories of the vehicle functions and also provides the cranking power necessary to start the vehicle engine. After, the engine is running the vehicle electrical systems are generally powered by an alternator.

Resistive element 20 is connected to either end of switch 18. Resistive element 20 is positioned on a path that allows a current to bypass switch 18 when switch 18 is in the open configuration illustrated in FIG. 1.

Switch 18 has a first end 22 and a second end 24 which are bridged by a movable switch 26 of switch 18.

Figure 3:
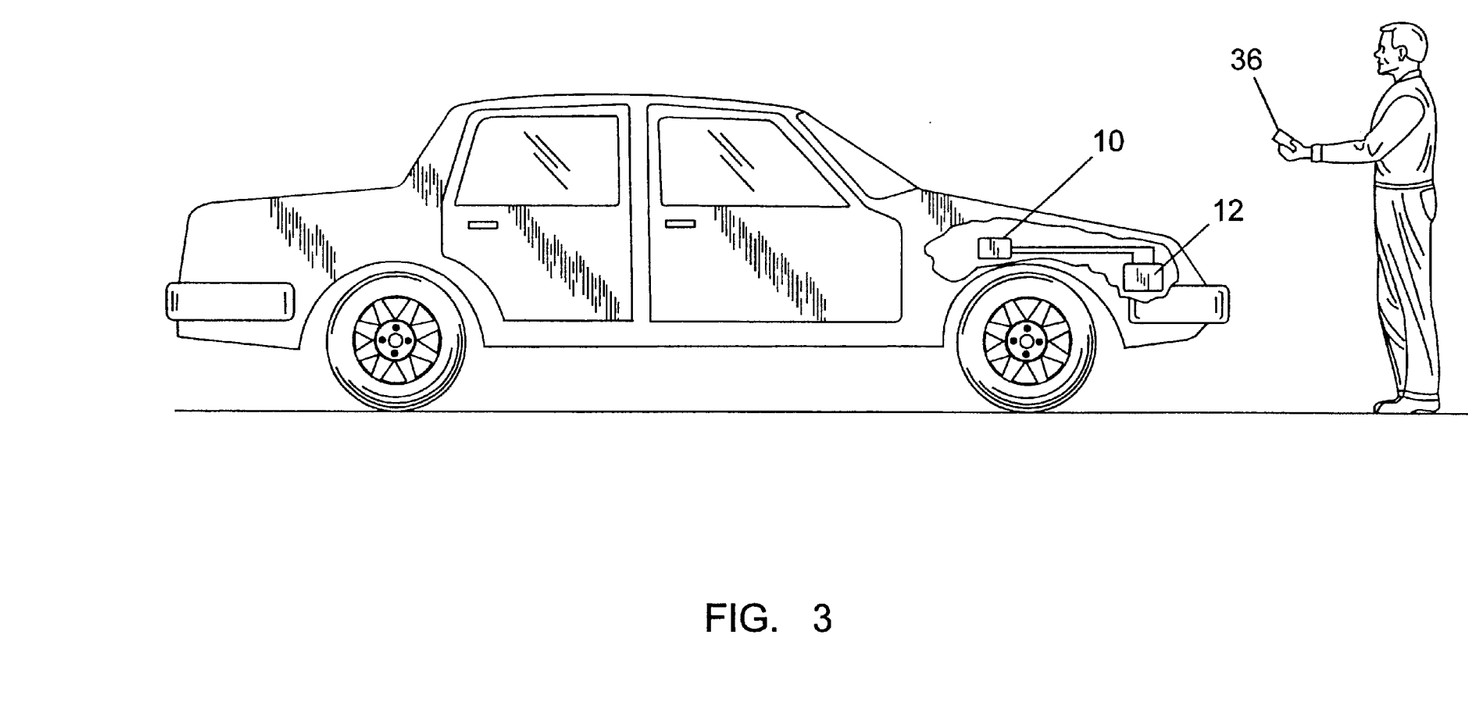
FIG. 3 illustrates remote activation of the anti-theft system.

The output of battery control system 10 is received into an electrical system 28 of a vehicle (FIG. 3). Electrical system 28 includes but is not limited to the following: vehicle accessories 30, an alternator 32 and a starter circuit 34.

Figure 4:
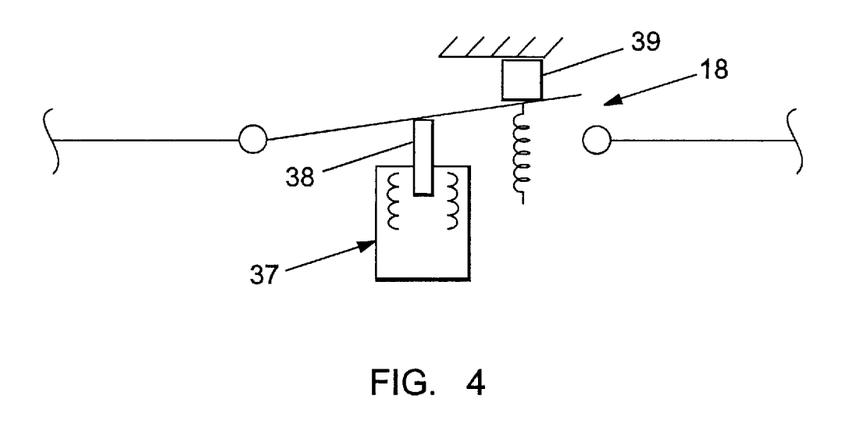
FIG. 4 is a schematic illustration of a latching relay used with the anti-theft system.
Figure 5:
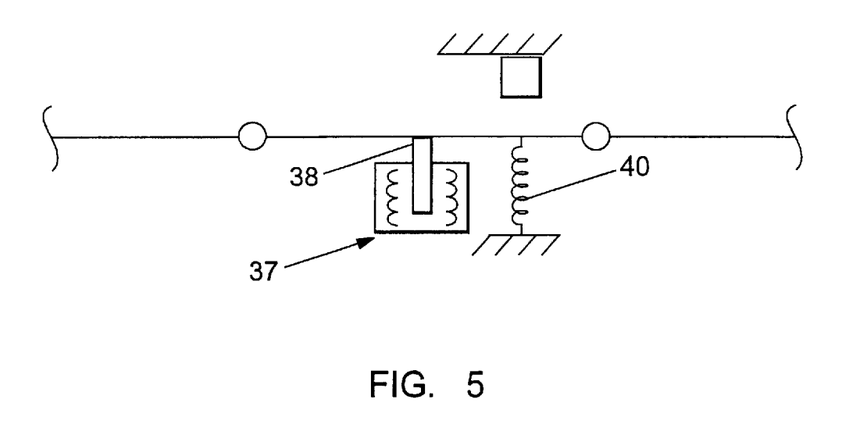
FIG. 5 is a schematic illustration illustrating an alternative configuration of the latching relay used with the anti-theft system.

In an exemplary embodiment, and referring now to FIGS. 3–5, switch 18 is remotely activated by a radio frequency emitted by a hand held transmitter 36 which sends an arm/disarm signal to switch 18. In an exemplary embodiment, transmitter 36 is a key fob that is capable of being installed on a key chain.

Transmitter 36 sends a first signal for positioning switch 18 into an open position (FIG. 4) and a second signal for positioning latching relay into a closed position (FIG. 5). As an alternative, transmitter 36 sends a signal for alternating the switch (latching relay) position.

Switch 18 has a solenoid 37 with a plunger 38 for moving the mechanical relay. The coil of solenoid 37 is excited to open the switch by applying power in a first direction. Once in this opened position, a magnet 39 will retain the mechanical relay in an open configuration.

In order to close the mechanical switch power is applied to the coil an opposite direction creating a magnetic force which will reverse the position of switch into the closed position illustrated in FIG. 5. A spring or urging mechanism 40 provides an urging force to assist in the closing of the latching relay.

Of course, other mechanical means for opening and closing be latching relay the via a signal sent by a remote transmission device are contemplated for use with the anti-theft system of the present application.

Resister 20 allows an amount of current from power supply 12 sufficient enough to maintained the volatile memories of vehicle accessories such as computer control module, radio presets and clocks.

In an exemplary embodiment resister 20 has a value between a high-end of 1 ohm and a low-end of 10 milli-ohms. Of course, the value of resister 10 may be greater than or less than the after mentioned range. The preferred value of resister 20 is a value that will prevent the loss of volatile memory when the antitheft system is engaged (i.e. switch 18 open) while preventing a current strong enough to start a vehicle engine to pass through.

Figure 2:
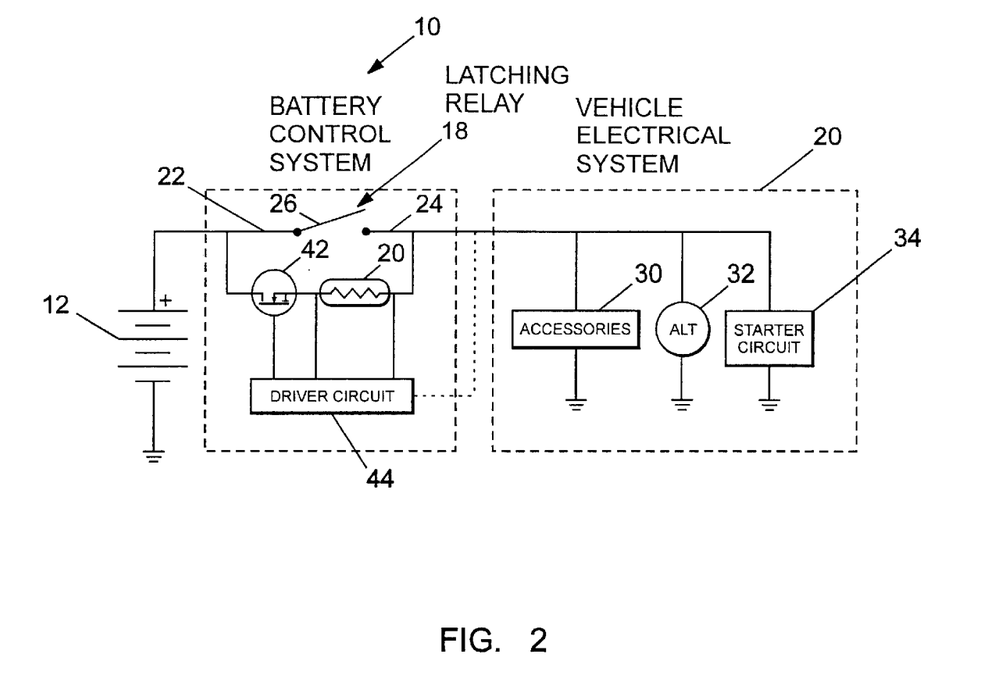
FIG. 2 is a schematic illustration of an alternative configuration of the anti-theft system illustrated in FIG. 1.

Referring now to FIG. 2, a preferred schematic of an antitheft mechanism 10 is illustrated. Here a MOSFET 42 is positioned between the input of resister 20 and the power supply 12. MOSFET 42 provides a protective feature that prevents resister 20 from being burned out due to an excessive load trying to pass through resister 20. This could be caused by an unauthorized attempt to start the vehicle when the antitheft system has been armed and switch 18 is in an open position. In this situation, MOSFET 42 will open up and completely disconnect the system from power supply 12.

A driver circuit 44 samples the current passing through resister 20. In addition, driver circuit 44 will instruct MOSFET 42 to open in the event an excessive amount of current is attempting to pass through resister 20.

For example, and in a situation where an unauthorized attempt to start the vehicle occurs (i.e. antitheft mechanism armed and a switch 18 is in an open position) a substantially large amount of current will be detected by the driver circuit 44. At this point, the driver circuit 44 will immediately instruct the MOSFET to open. At this point the vehicle electrical system will be completely removed from the power supply. This will prevent resistive element 20 from being burned out by the current.

The driver circuit will sample the voltage drop across the resister element or alternatively (as illustrated by the dashed lines in FIG. 2) the driver circuit will look at the output of the battery control system.

Referring now to FIGS. 1–4 an alternative embodiment of the system also utilizes a means for discriminating the AC waveforms that appear through the battery terminals, as a result of engine ignition. When these waveforms are present, software using a pattern recognition algorithm to detect these conditions will then inhibit the arming of the anti-theft device. This will prevent the system from arming while the vehicle is running.

The engine-on detection system only requires electrical connections at the battery terminals. No other electrical connections are required by virtue of the fact that the engine-on signal can be detected through the battery terminals.

The engine-on detection sub-system uses the AC component of any signal that appears between the positive and negative battery terminals as an input and amplifies it and then transmits it to the microprocessor, which then samples this waveform in real time.

When the engine is running, the waveform has a profile that is unique with respect to frequency range and amplitude to any other components or conditions, which will create a signal between the positive and negative battery terminals.

Figure 6:
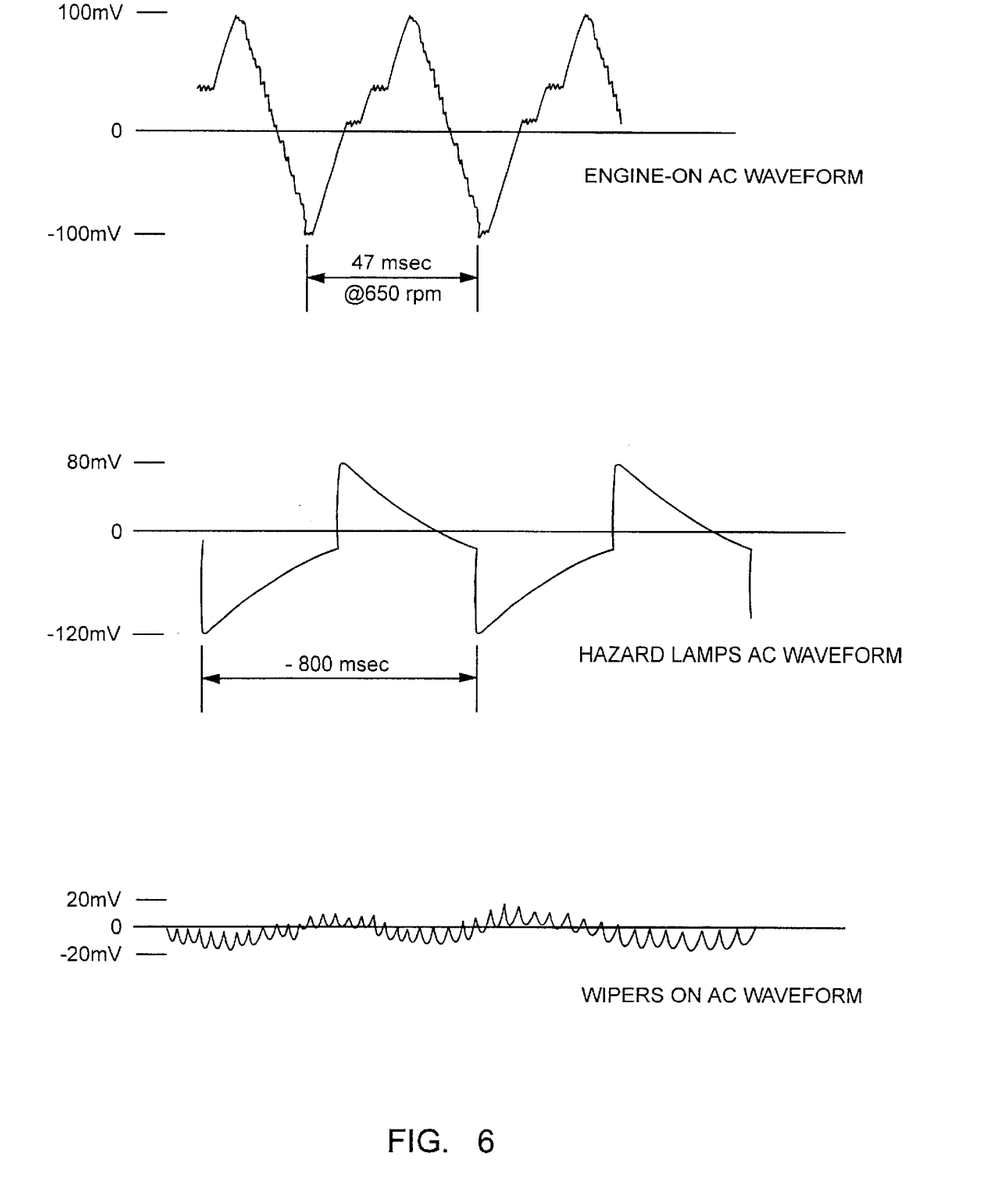
FIG. 6 illustrates possible AC waveforms generated at the terminals of a battery in a vehicle.

FIG. 6 illustrates the AC waveform created by the electrical system when the engine is on. In addition, FIG. 6 illustrates some other possible waveforms which may be generated at the terminals up the battery.

Figure 7:
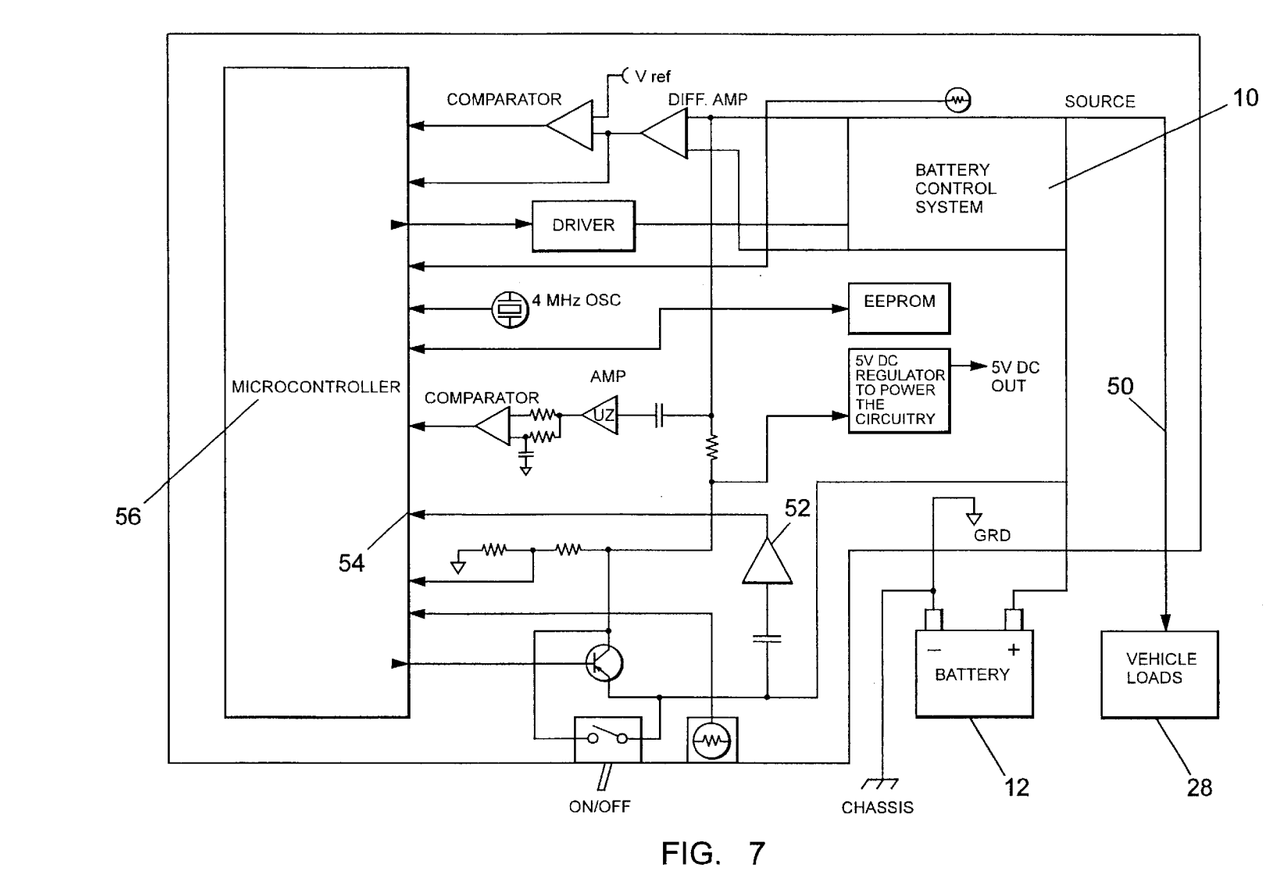
FIG. 7 is a schematic illustration of a circuit for measuring the AC waveforms illustrated in FIG. 6.

It is unlikely that any other part of the electrical system will generate an AC waveform with the AC amplitude exhibited by the engine on condition. Referring now to FIG. 7, the circuitry of the amplifier that detects the load fluctuation, which prevents anti-theft arming, is comprised of two parts.

The first part is an amplifier that amplifies the AC waveform existing across the vehicle electrical load at the junction 50 of the battery control system and the vehicle load.

The second part is a comparator that inputs the amplified threshold voltage into a comparator. The comparator is set to create a square wave pulse into an interrupt pin of the microcontroller.

Amplifier 52 receives the AC component of the signal present at junction 50 due to the engine ignition activity. An exemplary minimum value would be 50 mV peak-to-peak. Amplifier 52 transmits this signal with a gain to an analog-to-digital microprocessor input 54 of a microprocessor 56. The frequency and amplitude of this signal is a function of engine rpm, and is discriminated by the microcontroller for use in inhibiting a battery disconnect.

Figure 8:
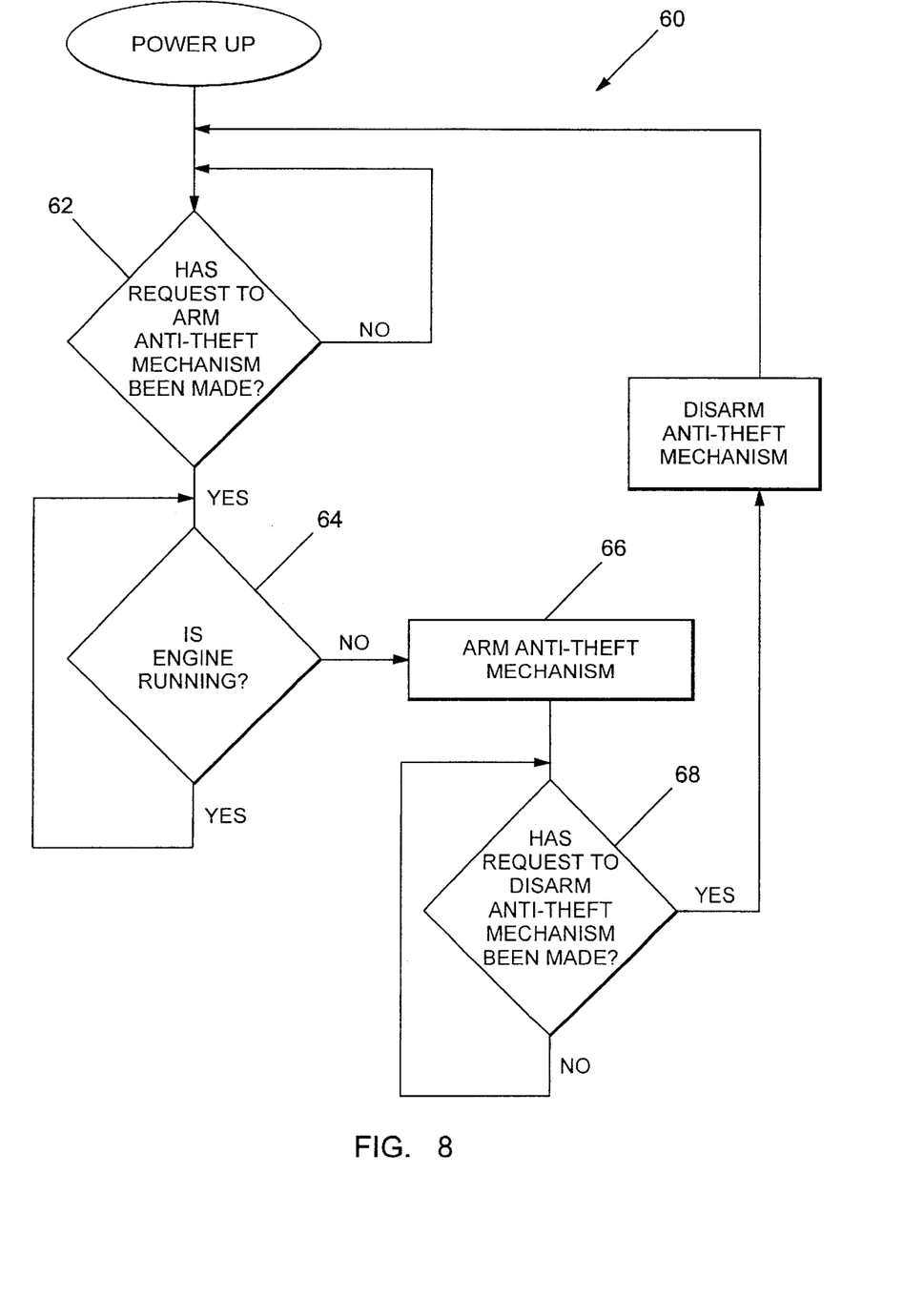
FIG. 8 is a flowchart illustrating the command sequence of a computer algorithm utilized in the FIG. 7 embodiment.

Referring now to FIG. 8, a flowchart 60 illustrates portions of a command sequence employed by the control algorithms stored in the microprocessor of the anti-theft system. A first step or decision node 62 depicts a request for arming of the anti-theft mechanism. A second decision node 64 determines whether the vehicle engine is running, an operating condition in which it may be undesirable to arm the anti-theft mechanism.

This is determined by utilizing signal processing and pattern recognition software wherein the unique waveform (FIG. 6) produced by the vehicle engine at the battery terminals is compared to profile signals that are stored in the memory of an EEPROM (FIG. 7).

If decision node 64 determines that the engine is running the vehicle battery cannot be disconnected and the system returns to decision node 64. In addition, the signal processing and pattern recognition software can be configured to detect other conditions in which a battery disconnect may be undesirable. For example, hazard flashers and wipers-on are situations in which a battery disconnect would be undesirable.

In addition, and as yet another alternative, the pattern recognition software can be configured to detect any waveform with a peak to peak the value above a predetermined value. Accordingly, if the pattern recognition software detects any AC signal above a predetermined threshold the arming of the antitheft mechanism would be prevented. Otherwise, and if the presence of such a signal is not detected, the arming of the system would be allowed.

The sensing of the engine on is accomplished by discriminating the profile of the electrical activity that is impressed upon the 12V bus due to the ignition system. The circuitry for discriminating ignition activity separates the AC component due to the ignition system from the total DC. The AC signal is then conditioned for input into the microcontroller. The microcontroller determines whether the signal is consistent with the expected engine-on profile, or if the signal is due to some other electrical activity such as the radiator fan motor, the ventilation blower motor, etc.

Accordingly, and if it has been determined that the vehicle engine is running, decision node 64 prevents the arming of the anti-theft switch until the engine is off. If on the other hand decision node 64 determines that the engine is not on, a command step arms the anti-theft mechanism.

Accordingly, and based upon the profile incorporated into the microcontroller, the battery can be disconnected only if the engine is not on.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A theft prevention device for a vehicle having an electrical system and a power supply, the theft prevention device comprising:

an "armed status" to prevent theft of the vehicle;

a remotely activated latching relay configured for movement between a first position and a second position, said remotely activated latching relay connects the electrical system to the power supply when said relay is in said first position and said relay disconnecting the power supply from the electrical system when said relay is in said second position, said second position corresponding to said "armed status" of the theft protection device;

a bypass circuit being configured to connect the electrical system to the power supply, said bypass circuit allowing a current from the power supply to reach the electrical system when said remotely activated latching relay is in said second position, said current being less than the current traveling through said remotely activated latching relay when said relay is in said first position, said current being in a range sufficient to maintain volatile memories of electrical components in the vehicle; and a hand-held transmitter being configured to remotely activate said latching relay.

2. The theft prevention device as in claim 1, further comprising:

a resistive element being positioned in said bypass circuit, said resistive element being configured to prevent a current value large enough to start an engine of the vehicle from passing through said bypass circuit.

3. The theft prevention device as in claim 2, further comprising:

an electrical switch being configured to couple said resistive element to the power supply, said electrical switch being opened when an excessive current is sensed in said bypass circuit.

4. The theft prevention device as in claim 3, further comprising:

a driver circuit, said driver circuit being configured to monitor the current in said bypass circuit.

5. An engine start inhibitor for preventing the starting of an engine of a vehicle by disconnecting a battery from electrical loads required to start the engine, the engine start inhibitor comprising:

an "armed status" to prevent theft of the vehicle;

a microprocessor being configured to receive a plurality of inputs, said plurality of inputs corresponding to signals indicative of the vehicle's operational status;

a switching mechanism being configured for movement between an open position and a closed position, said switching mechanism connecting a first electrical load to the battery when said switching mechanism is in said closed position and said switching mechanism disconnecting said first electrical load from the battery when said switching mechanism is in said closed position, said open position corresponding to said "armed status" of the engine start inhibitor;

a switch bypass circuit being configured to connect a second electrical load to the battery, said second electrical load being connected to the battery by another switch, said second electrical load being less than said first electrical load and is insufficient to start the engine;

a controller for manipulating said switching mechanism between said open position and said closed position, said controller manipulating said switching mechanism in response to a signal received from a remote transmitter.

6. An engine start inhibitor for a vehicle having an engine and a battery, the engine start inhibitor comprising:

an "armed status" to prevent theft of the vehicle;

a microprocessor being configured to receive a plurality of inputs, said plurality of inputs corresponding to signals from the vehicle;

a switch being configured for movement between an open position and a closed position, said switch connecting a first electrical load to the battery when said switch is in said closed position and said switch disconnecting said first electrical load from the battery when said switch is in said closed position, said open position corresponding to said "armed status" of the engine start inhibitor;

a switch bypass circuit being configured to connect a second electrical load to the battery, said second electrical load being connected to the battery by another switch, said second electrical load being less than said first electrical load and said second electrical being insufficient to start the engine;

a controller being configured to manipulate said switch between said open position and said closed position, said controller being configured to manipulate said switch in response to a signal received from a remote transmitter, said controller also being configured to manipulate said another switch of said switch bypass circuit into a closed circuit position when said switch is in said open position, wherein said another switch in said switch bypass circuit is a MOSFET.

7. An antitheft mechanism for disconnecting a battery of a starting system of a vehicle, the antitheft mechanism comprising:

an "armed status" to prevent theft of the vehicle;

a remotely activated switch for connecting and disconnecting the battery to the starting system through a first conductive path, said first conductive path being disconnected when said antitheft mechanism is in said "armed status";

an electronic switch for connecting and disconnecting the battery to an electrical load through a second conductive path comprising a resistor;

a driver circuit for sampling a voltage drop through said resistor, said driver circuit opening said electronic switch in response to a predetermined voltage drop sensed across said resistor, wherein unauthorized starting of the vehicle is prevented by the opening of said remotely activated switch prior to the engine being started and, said resistor is protected from excessive voltage loads by said electronic switch.

8. The antitheft mechanism as in claim 7 wherein said electronic switch is a MOSFET.

* * * * *